United States Patent [19]
Murakami

[11] 3,895,547
[45] July 22, 1975

[54] TRANSMISSION CONTROL SYSTEM
[75] Inventor: Noboru Murakami, Nagoya, Japan
[73] Assignee: Aisin Seiki Kabushiki Kaisha, Japan
[22] Filed: July 25, 1974
[21] Appl. No.: 491,681

[30] Foreign Application Priority Data
July 25, 1973  Japan............................. 48-83194

[52] U.S. Cl. ..................... 74/867; 60/427; 60/484
[51] Int. Cl............................................. B60k 21/12
[58] Field of Search ........ 74/867, 868, 869; 60/427, 60/435, 484

[56] References Cited
UNITED STATES PATENTS

| | | | |
|---|---|---|---|
| 3,394,622 | 7/1968 | Chana................................... | 74/867 |
| 3,543,611 | 12/1970 | Uozumi et al. ....................... | 74/867 |
| 3,590,663 | 7/1971 | Yamaguchi et al................... | 74/867 |
| 3,672,243 | 6/1972 | Murakami et al. ............... | 74/867 X |

Primary Examiner—Edgar W. Geoghegan
Attorney, Agent, or Firm—Oblon, Fisher, Spivak, McClelland & Maier

[57] ABSTRACT

A transmission control system for vehicles includes a governor valve, a throttle valve, a shift valve for automatically engaging and disengaging the clutches and brakes, and a modulator valve for controlling the fluid communication between the throttle and shift valves, whereby the throttle pressure generated by the throttle valve is transmitted directly to the shift valve from the throttle valve, within a predetermined throttle pressure range which corresponds to the degree to which the engine throttle is opened, and which may then be varied by means of the modulator valve when the throttle pressure is above a predetermined throttle pressure or value.

5 Claims, 3 Drawing Figures

TRANSMISSION CONTROL SYSTEM

BACKGROUND OF THE INVENTION

1. Field of the Invention

The present invention relates generally to a transmission control system for vehicles, and more particularly to a fluid pressure control system for automatic vehicle fluid transmissions.

2. Description of the Prior Art

Generally, within vehicle fluid transmissions, a shift valve is provided for engaging or disengaging a plurality of frictional means, such as for example, the clutches and brakes, and is controlled by means of a governor pressure, a throttle pressure being applied in the opposite direction. Although the throttle pressure is increased in proportion to the degree to which the engine throttle is opened, the governor pressure is increased in proportion to the vehicle speed and more particularly is a second power function. Therefore, the governor pressure within conventional systems must be altered two or three times in order to decrease or avoid any shocks resulting from transmission gear shifts.

Within automatic transmissions however, wherein more than four gear shift changes will occur and which comprise two clutches and three brakes, it is necessary to provide more than three shift valves. In such cases, when the governor pressure as above mentioned is applied to the 1–2 shift valve, for example, it is necessary to provide such valve with a large area so as to be sufficient to receive the governor pressure which is relatively low at the second stage, and this of course causes substantial design difficulties.

In order to obviate the above-mentioned drawbacks, other conventional transmission control systems have proposed two independent governor pressures, the one of which having a greater pressure or value being applied to the 1–2 shift valve while the other governor pressure having a smaller pressure or value is applied to the 2–3 shift valve. Such a system however, is nevertheless not totally satisfactory because limited space has to be utilized and the cost of such a system is substantially high in order to provide two governor pressures.

SUMMARY OF THE INVENTION

Accordingly, it is an object of the present invention to provide an improved transmission control system which may overcome the conventional difficulties as mentioned hereinabove.

Another object of the present invention is to provide an improved transmission control system wherein the throttle pressure is supplied directly to the shift valve as long as the throttle pressure is below a predetermined value and wherein further the throttle pressure is supplied with a different value or rate of increase to the shift valve when the throttle pressure is above the predetermined value.

Still another object of the present invention is to provide an improved transmission control system wherein the value or rate of increase of the throttle pressure may be altered to various values whereby the design of the shift valve is substantially simplified.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
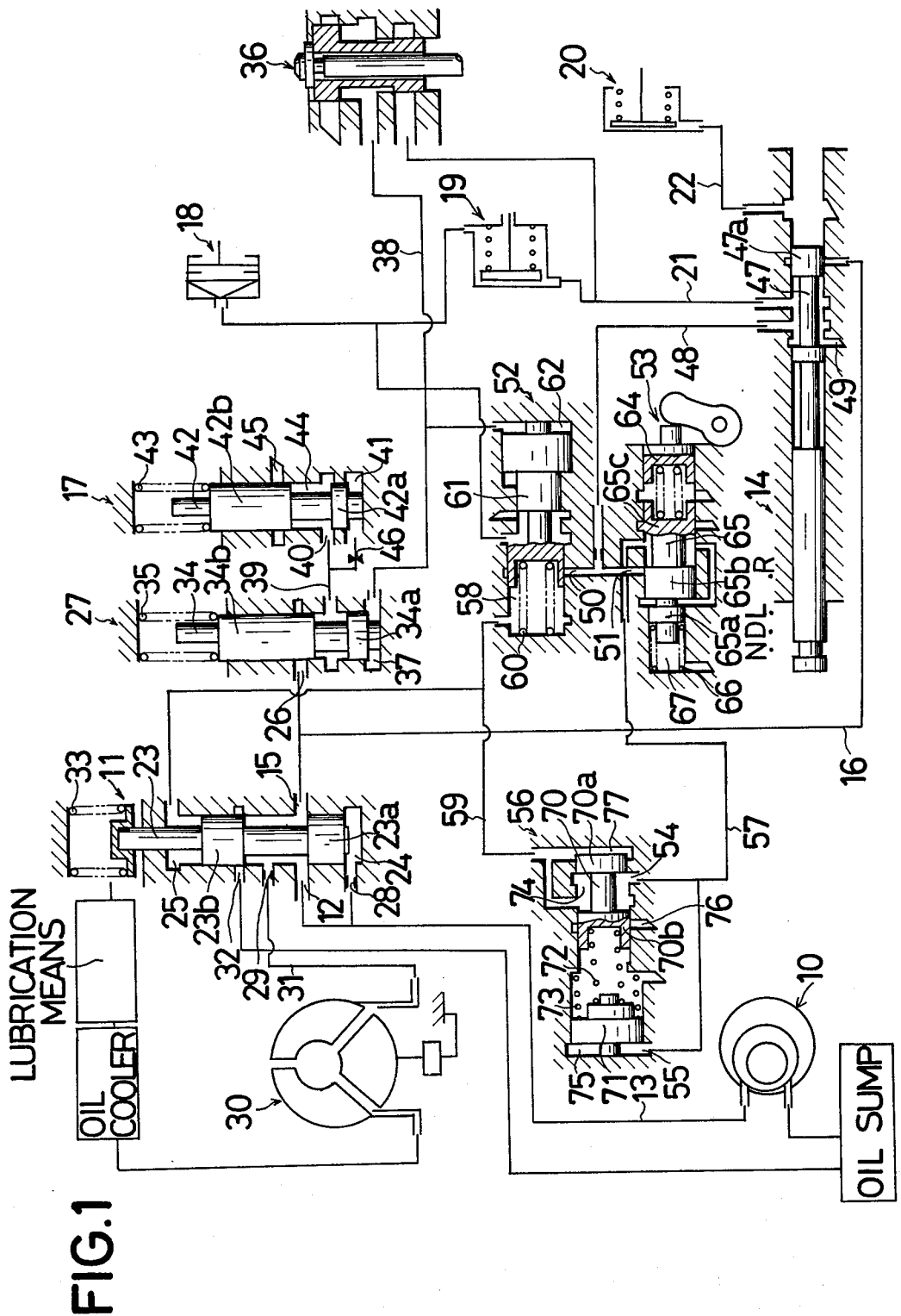
FIG. 1 is a schematic view of a transmission control system constructed according to the present invention and showing its cooperative parts.

Referring now to the drawings and more particularly to FIG. 1 thereof, an oil pump 10 is driven by means of the vehicle engine, not shown, and the oil pumped thereby is transmitted into the oil pressure control circuit. A first regulator valve, generally indicated by the reference character 11, includes a port 12 into which the pressurized oil from the pump 10 is transmitted through means of a main line or a conduit 13 and such fluid is regulated to a predetermined high pressure value. A manual shift valve, generally indicated by the reference character 14, is fluidically connected with regulator valve 11 through means of port 15 thereof and a conduit 16 which thereby supplies either the regulated high line pressure from the first regulator valve 11 or the regulated low line pressure which is to be supplied from a second regulator valve, generally indicated by the reference character 17. One of the line pressures is selectively applied to a clutch 18 or brakes 19 and 20 by means of fluid conduits 21 and 22 whereby the transmission, not shown, is able to attain the different drive ratios as a result of the selective actuation of either the clutch 18 or one of the brakes 19 and 20.

The first regulator valve 11 further includes a valve spool 23 having two axially spaced lands 23a and 23b disposed thereon and fluid chambers 24 and 25 associated therewith and at opposite ends thereof for applying fluid pressure to the lands 23a and 23b and the port 15 of the first regulator valve 11 is also fluidically connected to a port 26 of a regulator cut valve, generally indicated by the reference character 27, through means of a branch conduit which is also connected with conduit 16. An orifice 28, provided in conjunction with chamber 24 and being fluidically connected with conduit 13, serves to absorb any pulses characteristic of the pressurized fluid supplied to the expansible chamber 24 so as to thereby prevent the valve spool 23 from undergoing or being subjected to any vibration. Another orifice 29, similarly associated with valve 23, serves to regulate the flow quantity of lubricating oil supplied to a hydraulic torque converter 30 from a lubrication means and cooler through means of a converter feed line 31.

When the oil pressure within chamber 24 is applied to the land 23a of valve spool 23, the opening and closing operation of a discharge port 32 of valve 11 is controlled by means of the land 23b of the valve spool 23 against the biasing force of a spring 33 which is associated with that end of spool 23 which is disposed opposite that end upon which is disposed land 23a. As a result of such operation, a throttle pressure is transmitted into chamber 25 with a resulting force also being applied to land 23b, and consequently, the high line pressure, which varies in accordance with the variation in throttle pressure, is supplied to conduit 16.

The regulator cut valve 27 similarly includes a valve spool 34 having two lands 34a and 34b of the same diametrical extent, a spring 35 being associated with that end of spool 34 which is disposed opposite that end upon which is disposed land 34a so as to normally bias the spool 34 in the downward direction as seen in FIG. 1. The cut valve 27 is normally in the state shown within FIG. 1 as a result of the biasing force of spring 35, and when the valve is within such state, port 26 which is fluidically connected to conduit 16 is closed by means of land 34b. When the governor pressure which is to be generated by means of a governor valve 36 and supplied into the lower chamber 37 of valve 27 through means of a conduit 38 is greater than a predetermined value such as to overcome the biasing force of spring 35, the valve spool 34 will be displaced in the upward direction as seen in FIG. 1 whereby the port 26 will now be fluidically connected to a conduit 39 which in turn is connected to a port 40 and a chamber 41 of the second regulator valve 17. The second regulator valve 17 is also provided with a valve spool 42, which includes two lands 42a and 42b of the same diameter, and a spring 43 for biasing the valve 42 in the downward direction as seen in FIG. 1.

The oil pressure transmitted from the port 40 and into a chamber 44 defined between lands 42a and 42b controls the displacement of spool 42 and the consequent opening and closing of a drain port 45 through means of land 42b at a pressure substantially equal to the oil pressure supplied to chamber 41 through means of an orifice 46 which serves to prevent any pulsations and vibrations from being transmitted to valve spool 42, and such oil pressure is regulated as the lower line pressure, as opposed to the high line pressure regulated by means of the first regulator valve 11. This low line pressure is applied to the manual shift valve 14 through means of conduit 39, port 26 of cut valve 27, and conduit 16, and when the line pressure within conduit 16 becomes low line pressure, the valve spool 23 of the first regulator valve 11 is moved in the downward direction as a result of the biasing force of spring 33 whereby the first regulator valve 11 is disposed in a non-actuating state.

When the manual shift valve 14 is positioned to the neutral position designated N, the end of the conduit 16 associated with valve 14 will be closed by means of a land 47a disposed upon spool valve element 47 of valve 14 and the conduits 21, 22, and 28 will all be connected with a drain port 49 of valve 14 whereby the clutch 18 and the brakes 19 and 20 will be in a released state, the neutral state thus being attained. When the manual shift valve 14 is shifted to the drive position designated D, the conduit 16 will now be fluidically connected to the conduits 21 and 48, and similarly, when the manual shift valve 14 is shifted further to the low position designated L, the conduit 16 will be connected solely with conduit 21. Still further, when the manual shift valve 14 is displaced to the reverse position designated R, conduit 16 will be fluidically connected solely with conduit 22.

Conduit 48 is respectively fluidically connected to ports 50 and 51 of a shift valve 52 and a throttle valve 53, the latter of which regulates the throttle pressure in accordance with the degree to which the engine throttle valve, not shown, is opened. The pressure regulated by means of the throttle valve 53 is transmitted to ports 54 and 55 of a modulator valve 56 by means of a conduit 57 and the pressure supplied to the modulator valve 56 is in turn transmitted to a chamber 58 of the shift valve 52 through means of a conduit 59. A compression coiled spring 60 is disposed within chamber 58 so as to bias a valve spool 61 toward the right as seen in FIG. 1, and a chamber 62, supplied with the governor pressure through means of the conduit 38, is defined within the extreme right end portion of valve 52 whereby the governor pressure may counteract the forces of the spring 60 and the throttle pressure within chamber 58.

The throttle valve 53 includes a plug 64 movably disposed within the right end portion thereof, a valve spool 65 having a plurality of lands 65a, 65b, and 65c, and a coil spring 66 for urging the valve spool 65 toward the right as seen in FIG. 1. A chamber 67 is defined within the left end portion of valve 53 and the port 51 is normally connected to the port 50 of shift valve 52 and the conduit 48.

The throttle modulator valve 56 includes a valve spool 70 having lands 70a and 70b respectively disposed upon the right and left end portions thereof as seen in FIG. 1, a plug 71 movably disposed within the left end portion of the valve as seen in FIG. 1, a spring 72 interposed between valve spool 70 and plug 71 for biasing such components apart from each other, and another spring 73 similarly interposed between plug 71 and a stationary shoulder, not numbered, of the valve 56 for baising the plug 71 toward the left in FIG. 1. The throttle pressure regulated by means of the throttle valve 53 is supplied through conduit 57 and port 54 to a hydraulic chamber 74 defined between lands 70a and 70b as well as to another hydraulic chamber 75, defined between the left end wall of valve 56 and plug 71, through port 55.

When the throttle pressure has a value less than a predetermined value, the pressure supplied to the chamber 74 is transmitted to the conduit 59 while a drain or discharge port 76 of valve 56 is closed by means of the land 70b. The pressurized fluid within the conduit 59 is always supplied to a chamber 77 defined between the right end wall of valve 56 and the land 70a of valve spool 70 so as to thereby counteract the biasing force of spring 72 and the regulated pressure within the line 57 is similarly supplied to the chamber 75 so as to thereby counteract the biasing force of the two springs 72 and 73.

In operation, the neutral state is shown in FIG. 1 and the high line pressure regulated by means of the first regulator valve 11 is supplied from port 15 of valve 11 to conduit 16, however, such high line pressure within conduit 16 is blocked by means of land 47a of valve spool 47 of the manual shift valve 14 as well as by land 34b of valve spool 34 of the regulator cut valve 27, and consequently, such high line pressure is not able to be transmitted to either of conduits 48, 21, or 22 whereby the clutch 18 and the brakes 19 and 20 are not able to be engaged. When however, the governor valve 36 is actuated and the manual shift valve 14 is displaced from the neutral state N to the drive state or position designated D, the line pressure within conduit 16 is now able to be transmitted to the conduits 48 and 21. The first brake 19 is thus able to be engaged as a result of the line pressure being transmitted through conduit 21, the branch conduit of which is connected to the governor valve 36. At this time, the line pressure within conduit 21 is a high line pressure as regulated by means of the first regulator valve 11 and this line pressure is additionally supplied to port 50 of shift valve 52 as well as port 51 of the throttle valve 53 through means of conduit 48.

The throttle pressure thus transmitted to the throttle valve 53 serves to further regulate the high line pressure, regulated by means of the first regulator valve 11, to an increased value in accordance with the degree to which the engine throttle valve, not shown, is opened and the thus regulated throttle pressure is then transmitted to ports 54 and 55 of throttle modulator valve 56 through means of conduit 57. As long as the throttle pressure is less than or within a predetermined value or range, the valve spool 70 and the plug 71 of modulator valve 56 will be disposed within the positions shown in FIG. 1 by means of the biasing force of spring 72, and consequently, the pressure within conduit 59 will be the same as the pressure within conduit 57.

Thereafter however, when the throttle pressure reaches the predetermined value, the valve spool 70 will be moved toward the left as seen in FIG. 1 due to the increased pressure within the right chamber 77 acting against the biasing force of spring 72, the modulating operation of valve 56 thus beginning. When the movable plug 71 is so designed to begin its movement simultaneously with the commencement of modulating operation, the throttle modulator pressure is increased as is shown by the broken line A with FIG. 2. Similarly, when the area of the plug 71, and the forces of springs 72 and 73 are designed whereby movement is begun after a further increased throttle pressure is attained, the modulator pressure is increased as is shown by the dotted line B in FIG. 2. Such changes in the characteristics of modulator pressure will be realized by the cross-sectional area of plug 71 which is exposed to the left chamber 75 and the biasing force of spring 73. The slope or rate of increase of each line will also be determined by the cross-sectional area of spool 70 which is exposed to the right chamber 77 and the biasing force of spring 72 in addition to the above-mentioned factors.

The thus regulated pressure is supplied to the pressure increasing chamber 25 of the first regulator valve 11 and the hydraulic chamber 58 of the shift valve 52, respectively, through means of conduit 59. The governor pressure generated by means of the governor valve 36 is similarly supplied to the hydraulic chamber 62 of shift valve 52 through means of conduit 38 so as to thereby counteract the modulating pressure and the biasing force of spring 60 within chamber 58. Consequently the movement of valve spool 61 within the shift valve 52 is controlled by the relative or differential force characteristic of the chambers 58 and 62. The throttle pressure admitted to chamber 25 of the first regulator valve 11 will act to further increase the high line pressure in accordance with the degree to which the engine throttle valve is opened, and thus, the throttle pressure transmitted to chamber 58 of shift valve 52 serves to retain, in cooperation with spring 60, the valve spool 61 in the original position shown in FIG. 1 despite or in counteraction against the governor pressure within chamber 62.

The valve spool 61 of shift valve 52 interrupts fluidic communication between the conduits 48 and 69 until the governor pressure within chamber 62 is increased to a predetermined value sufficient to overcome the throttle pressure within chamber 58 and the biasing force of spring 60. Consequently, when the manual shift valve 14 is within the drive or D position and the vehicle speed is low whereby the governor pressure is not sufficiently high, low speed forward movement is obtained. When the vehicle speed is increased however, while the manual shift valve 14 is still within the drive or D position the governor pressure supplied to chamber 62 of shift valve 52 will naturally be increased so as to overcome the throttle pressure within chamber 58 and the biasing force of spring 60 and thereby move the valve spool 61 toward the left as seen in FIG. 1. The line pressure transmitted from conduit 48 and into conduit 69 is thus able to engage the clutch 18, and simultaneously therewith, the first brake 19 is released whereupon high speed forward movement is accomplished.

Figure 3:
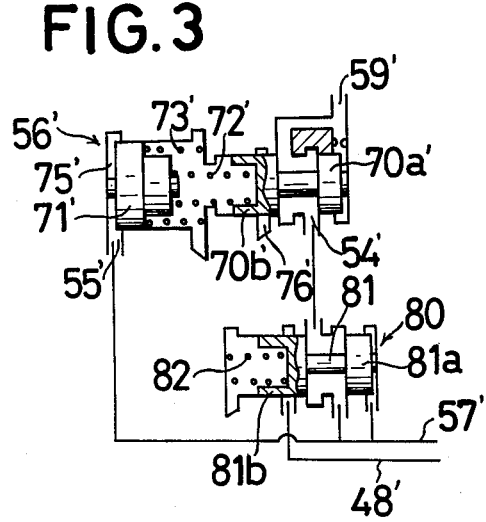
FIG. 3 is a schematic view of another embodiment of a modulator valve which may be utilized within the system of FIG. 1.

Referring now to FIG. 3, a modified embodiment of the invention is shown wherein the same structure as shown within the previous embodiment is designated with the same reference characters with primes (') additionally affixed thereto. The main difference within this embodiment when compared to the foregoing embodiment resides in the provision of a relay valve 80 disposed within conduit 57'. The relay valve 80 includes a valve spool 81 having lands 81a and 81b, and a spring 82 which biases the spool 81 toward the right end portion of the valve.

Figure 2:
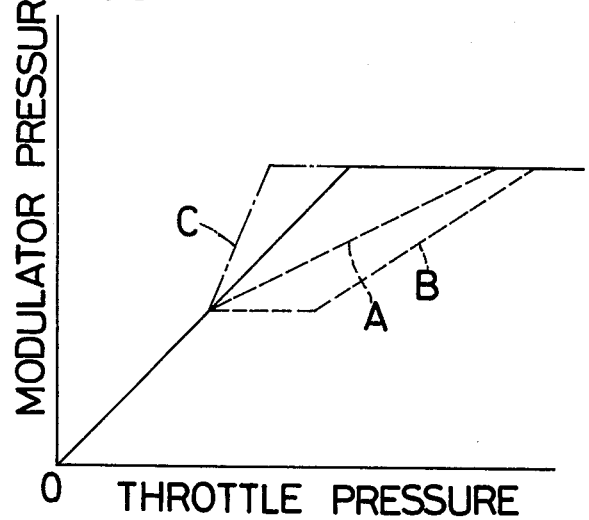
FIG. 2 is a graphical plot illustrating the pressure characteristics in accordance with the present invention.

When the throttle pressure within conduit 57' is less than or within a predetermined value or range, the spool 81 of relay valve 80 is not moved and consequently the throttle pressure is transmitted to conduit 59' through means of the modulator valve 56'. When the throttle pressure is greater than the predetermined value, the regulated pressure, due to the axial movement of spool 81 of relay valve 80, is supplied to the inlet port 54' of modulator valve 56' and consequently, the line pressure from conduit 48' is transmitted to the modulator valve 56'. When the rate of increase of the throttle modulator pressure within conduit 59' is greater than that of the throttle pressure, the pressure characteristic as represented by the chain-dotted line C of FIG. 2 can be obtained. It should also be noted within either of the disclosed embodiments that the plugs 71 or 71' are engaged with the stationary wall of the modulator valve 56 and 56' so as to thereby terminate the movement thereof, and hence the throttle modulator pressure attains a constant value after a predetermined value of throttle pressure as is also seen in FIG. 2.

Obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. A transmission control system for a vehicle, comprising:
   a hydraulic fluid pressure source;
   fluid pressure regulator means for regulating the pressure of said hydraulic fluid from said fluid pressure source to a particular line pressure;

a plurality of frictional engaging means actuated by said line pressure from said fluid pressure regulator means for attaining a particular gear ratio within the gear trains of said transmission;

a governor valve for generating a governor pressure which is increased or decreased in response to the speed of said vehicle;

a manual shift valve operatively connected to said fluid pressure regulator means for selectively supplying said line pressure to either of said plurality of frictional engaging means;

a throttle valve fluidically connected to said manual shift valve for generating a throttle pressure reponsive to the degree to which the engine throttle valve is opened;

a shift valve fluidically connected to said manual shift valve and actuated in response to said governor pressure and said throttle pressure for automatically selectively actuating said plurality of frictional engaging means;

a hydraulic conduit for connecting said throttle valve to said shift valve; and a modulator valve disposed within said hydraulic conduit and actuated in response to said throttle pressure, whereby said throttle valve and said shift valve are fluidically communicated with each other in order to supply said throttle pressure directly to said shift valve when said throttle pressure is below a predetermined value, and to supply said throttle pressure to said shift valve with a different rate of increase when said throttle pressure is above said predetermined value.

2. A transmission control system as set forth in claim 1 wherein said modulator valve comprises:

a valve spool having two land means to control fluid communication between said throttle valve and said shift valve;

a first spring normally biasing said valve spool in the direction wherein said valve spool permits said fluid communication to be established; and a movable plug normally separated from said valve spool by means of said first spring and a second spring and which is moved against the biasing forces of said springs so as to establish a force having a value greater than a predetermined value of said throttle pressure, whereby a regulated pressure is supplied to said shift valve.

3. A transmission control system as set forth in claim 1, wherein:

a relay valve is interposed between said modulator valve and said manual shift valve within said hydraulic conduit;

said relay valve including a valve spool and a spring biasing said relay valve spool, whereby a regulated pressure above a predetermined value of said throttle pressure is supplied to said modulator valve.

4. A transmission control system as set forth in claim 2, wherein said modulator valve comprises:

a hydraulic chamber defined between said two lands of said valve spool;

a drain port normally closed by one of said lands of said valve spool and adapted to be opened so as to be in fluidic communication with said hydraulic chamber when said valve spool is moved in response to a pressure having a value above a predetermined value of said throttle pressure;

said throttle pressure also being applied to said plug so as to move said plug in the direction wherein the force of said first and second springs is added; and said regulated pressure also being applied to said valve spool so as to move said spool so as to thereby counteract the force of said first and second springs.

5. A transmission control system as set forth in claim 4, wherein:

said modulator valve further includes stopper means with which one end of said second spring is engaged, whereby the movement of said plug in response to said throttle pressure is limited and the regulated pressure to be applied to said shift valve is made constant above a predetermined value of said throttle pressure.

* * * * *